Dec. 2, 1952     W. H. WELLENSTEIN     2,619,877
ENGRAVING MACHINE
Filed Oct. 2, 1951
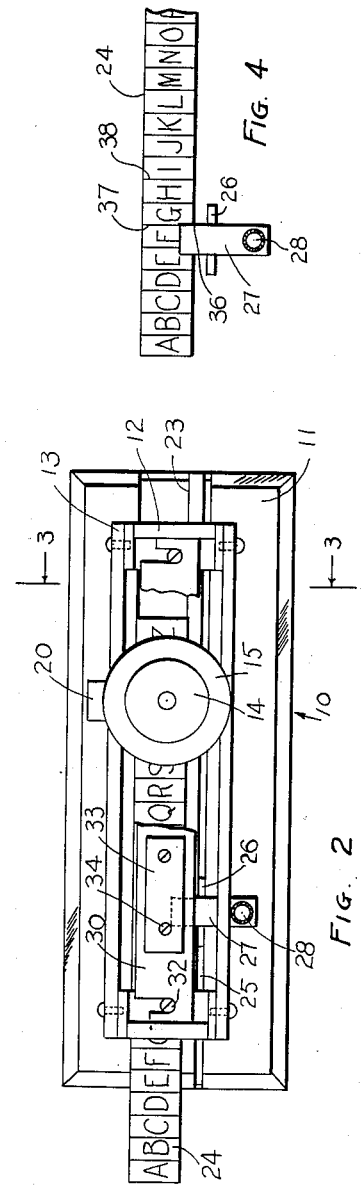
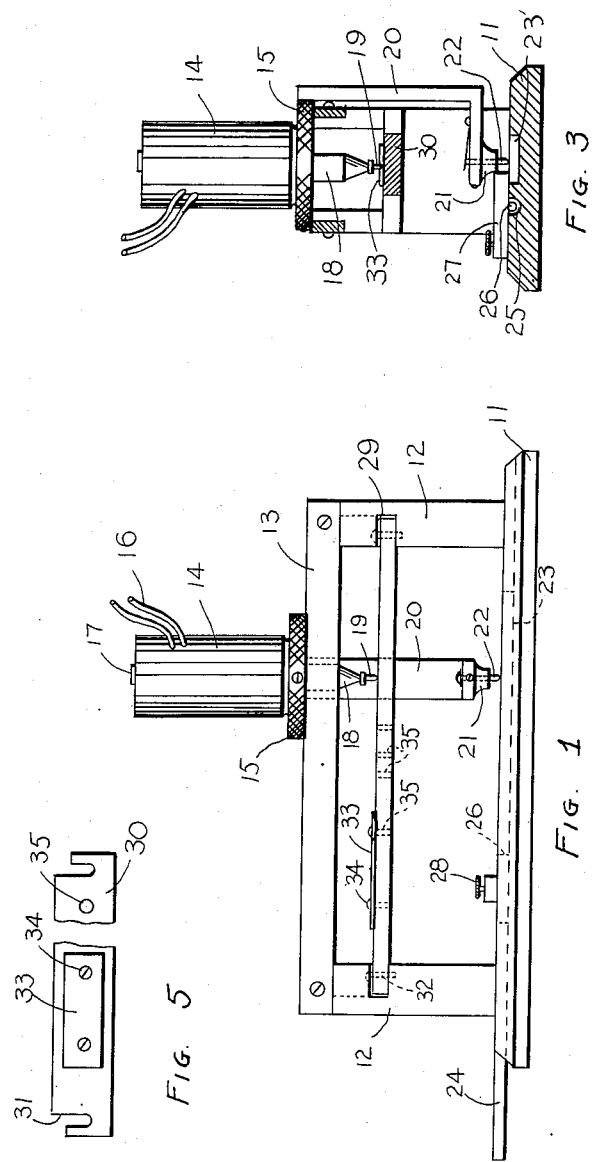
INVENTOR
WILLIAM H. WELLENSTEIN
BY Maurice W. Grady
ATTORNEY Patented Dec. 2, 1952

2,619,877

UNITED STATES PATENT OFFICE 2,619,877

ENGRAVING MACHINE

William H. Wellenstein, Schenectady, N. Y.

Application October 2, 1951, Serial No. 249,359

1 Claim. (Cl. 90—13.2)

This invention relates to an engraving machine.

All engraving machines with which I am familiar are mechanically complex units which depend upon the action of linkages or their mechanical equivalents to translate the movement of the tracer head to the cutter head. Unless precision work of a high degree of accuracy is required, engraving can be performed by a machine, such as I have invented, which does not have recourse to linkages.

The principal object of the invention is, therefore, to provide a machine capable of engraving by translating movement from the tracer head to the cutter head without the use of intervening linkages.

Other and further objects of this invention will appear from the following description, the accompanying drawings and the appended claim.

In the drawings:

Fig. 1 is a front elevational view of an engraving machine embodying my invention;

Fig. 2 is a plan view of such machine with parts cut away to more clearly show the elements;

Fig. 3 is a sectional view taken on the line 3—3 of Fig. 2;

Fig. 4 is a partial plan view of the copy plate and clamping spacer illustrating the method of spacing the letters, and;

Fig. 5 is a partial plan view of the work holder with the work piece attached thereto.

Reference is now made to Figs. 1 and 2 in which a frame, generally indicated as 10, comprising a base plate 11, upright supports 12, and parallel bars 13, serves to carry a motor 14 mounted upon a knurled flat plate 15, which spans bars 13 and is slidable longitudinally along the frame in either direction in response to manual action of the operator. Rotary electric motor 14 is equipped with conventional power leads 16 and starting switch 17. Dependent from the motor housing and operatively connected with the motor is a cutter head 18 which carries a rotary engraving cutting tool 19 for the engraving operation. Bracket 20 is attached to plate 15 and extends downwardly therefrom and inwardly under the engraving tool to carry tracer head 21 which is provided with a spring-urged stylus 22. Tracer head 21 and cutter head 18 are arranged one above the other so that the engraving tool 19 and stylus 22 are in exact vertical alignment.

Base plate 11 is provided with a slot 23 rectangular in cross section, which extends longitudinally throughout the plate for the reception of a copy plate or template 24. Copy plate 24 may be positioned longitudinally in the slot by the operator as desired. Parallel with slot 24 is a guide groove 25, arcuate in cross section, which slidably receives a guide leg 26 conventionally joined to the clamping spacer 27. Spacer 27 has a screw 28 by means of which said spacer may be clamped tightly against copy plate 24 to hold it in desired positioned in relation to the base plate 11.

Upright supports 12 are formed with slots 29 adjacent their tops for the reception of a work holder 30 (see Fig. 5) which may be slidably inserted therein. Holder 30 is provided with recesses 31 at its opposite ends to engage stops 32 extending through slots 31. A work piece, for example a name plate, will be screwed to the holder by running screws 34 into pre-formed threaded screw holes 35 (see Fig. 5) in the holder. The location of holes 35 and the screw holes in the work pieces are important since they serve to position the work piece in proper relation to the engraving tool. Additional screw holes 35 are shown in the work holder for use in connection with work pieces of different lengths.

In operation, holder 30, with a work piece 33 secured thereto, is inserted into slots 29 in uprights 12 and locked into position. The operator then slides the motor and its dependent assembly along bars 13 until cutting tool 19 is positioned over the work piece. Copy plate 24 is thereupon shifted in its slot until the character to be copied is located directly under stylus 22. Spacer 27 is then clamped into position by means of screw 28 to hold copy plate 24 tightly in working position. It is important that spacer 27 be clamped against copy plate 24 so that its right edge 36 (as seen in Fig. 4) is accurately aligned with the left marginal line of the letter to be copied. In Fig. 4, this would mean that if the letter "G" is to be copied, edge 36 would be aligned with marginal line 37 to the left of the letter "G." The copying is a simple manual operation. The operator merely moves the motor so that the associated stylus follows in the character to be copied and the rotary cutter forms the character in the work piece.

Upon completion of the copying of "G," spacer 27 is loosened slightly and moved one space to the right as seen in Fig. 4. Such movement lines up edge 36 with the line between "G" and "H," and thereby provides the spacing of the letters. The copy plate is next shifted for the copying of the following letter. If this letter should be "I,"

line 38 would be brought under edge 36, and spacer 27 again clamped upon the plate. It is, of course, necessary that the operator be careful not to let the holder be moved out of position while the copy plate is shifted.

It will be appreciated that the utility and range of the engraver can be extended by providing additional series of characters on the reverse side of copy plate 24.

While there has been hereinbefore described an approved embodiment of this invention, it will be understood that many and various changes and modifications in form, arrangement of parts, and details of construction thereof may be made without departing from the spirit of the invention and that all such changes and modifications as fall within the scope of the appended claim are contemplated as a part of this invention.

What I claim is:

In an engraving machine, a base plate having a longitudinal slot therein, a copy plate in the slot, clamping means attached to the base plate to lock the copy plate in adjusted position, a vertical support at each end of the base plate having a transverse slot in its inner side, a pair of parallel bars connecting the tops of the supports at equal distances from the base plate, a work holder detachably mounted in said slots and parallel with the base, a plate slidably supported on the bars, said plate having a cutting head centrally dependent therefrom between the bars and in engagement with the work holder, driving means for said cutting head, a bracket secured to the plate and dependent therefrom outside of said bars, the bracket having a turned-in portion lying beneath the work holder, and a tracer head on said portion in engagement with the copy plate.

WILLIAM H. WELLENSTEIN.

REFERENCES CITED

The following references are of record in the file of this patent:

UNITED STATES PATENTS

| Number | Name | Date |
|---|---|---|
| 696,951 | Eaton | Apr. 8, 1902 |
| 1,607,895 | Karr | Nov. 23, 1926 |
| 2,057,820 | Corwin | Oct. 20, 1936 |
| 2,303,006 | Swire | Nov. 24, 1942 |

FOREIGN PATENTS

| Number | Country | Date |
|---|---|---|
| 260,211 | Great Britain | May 18, 1926 |
| 284,471 | Great Britain | Feb. 2, 1928 |